United States Patent
Pruijmboom

(10) Patent No.: US 9,091,747 B2
(45) Date of Patent: Jul. 28, 2015

(54) SELF-MIXING INTERFERENCE DEVICE WITH WAVE GUIDE STRUCTURE

(75) Inventor: Armand Pruijmboom, Wijchen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 290 days.

(21) Appl. No.: 13/500,678

(22) PCT Filed: Oct. 18, 2010

(86) PCT No.: PCT/IB2010/054708
§ 371 (c)(1),
(2), (4) Date: Apr. 6, 2012

(87) PCT Pub. No.: WO2011/048538
PCT Pub. Date: Apr. 28, 2011

(65) Prior Publication Data
US 2012/0200858 A1    Aug. 9, 2012

(30) Foreign Application Priority Data

Oct. 23, 2009   (EP) .................................... 09173915

(51) Int. Cl.
    *G01B 9/02*        (2006.01)
    *G01S 7/481*        (2006.01)
    (Continued)

(52) U.S. Cl.
    CPC ........... *G01S 7/4814* (2013.01); *G01B 9/02028* (2013.01); *G01B 9/02092* (2013.01);
    (Continued)

(58) Field of Classification Search
CPC ........... G01B 9/02092; G01B 9/02097; G02B 6/4214; G02B 6/421; G01S 7/4916; G01S 17/58

USPC ........ 356/450–521, 4.09, 28.5; 345/157, 158, 345/163, 165, 166
See application file for complete search history.

(56) References Cited

U.S. PATENT DOCUMENTS 5,798,826 A *   8/1998   Yamamoto et al. .......... 356/4.09
6,872,931 B2     3/2005   Liess et al.
(Continued)

FOREIGN PATENT DOCUMENTS

DE     102004047679 A1    4/2006
JP       57079472 A       5/1982
(Continued)

OTHER PUBLICATIONS

Guiliani, Guido et al "Laser Diode Self-Mixing Technique for Sensing Applications" Journal of Optics A: Pure and Applied Optics, vol. 4, 2002, pp. S283-S294.
(Continued)

*Primary Examiner* — Tarifur Chowdhury
*Assistant Examiner* — Michael P Lapage

(57) ABSTRACT

The proposed self-mixing interference device comprises a substrate (1) with an integrated optical wave guide structure (3), a semiconductor laser source (2) arranged on a surface of the substrate (1) and emitting laser radiation towards said surface, and a photodetector arranged to detect intensity variations of the laser radiation. The wave guide structure (3) is optically connected to the laser source (2) and designed to guide the laser radiation emitted by the laser source to an out-coupling area at the surface of the substrate (1) and to guide a portion of the laser radiation scattered back from a target object (4) outside of the substrate (1) to re-enter the laser source (2). This self-mixing interference device can be realized with a lower total height compared to the known self-mixing interference devices.

14 Claims, 2 Drawing Sheets

(51) Int. Cl.
*G01P 3/36* (2006.01)
*G01P 13/04* (2006.01)
*G01S 17/50* (2006.01)
*G06F 3/042* (2006.01)
*G02B 6/42* (2006.01)

(52) U.S. Cl.
CPC ............... *G01P3/366* (2013.01); *G01P 13/045* (2013.01); *G01S 7/4811* (2013.01); *G01S 17/50* (2013.01); *G06F 3/042* (2013.01); *G02B 6/4214* (2013.01)

(56) References Cited

U.S. PATENT DOCUMENTS

| | | | |
|---|---|---|---|
| 6,934,444 B2 | 8/2005 | Ghiron et al. | |
| 2002/0104957 A1* | 8/2002 | Liess et al. | 250/221 |
| 2003/0006367 A1 | 1/2003 | Liess | |
| 2006/0072102 A1* | 4/2006 | Jianping et al. | 356/28.5 |
| 2006/0152494 A1 | 7/2006 | Liess | |
| 2006/0158654 A1* | 7/2006 | Liao et al. | 356/445 |
| 2007/0077900 A1* | 4/2007 | Grunhlke | 455/90.3 |
| 2007/0125937 A1 | 6/2007 | Eliasson et al. | |
| 2007/0139381 A1* | 6/2007 | Spurlock et al. | 345/166 |
| 2007/0170417 A1 | 7/2007 | Bowers | |
| 2008/0200781 A1* | 8/2008 | Van Herpen et al. | 600/316 |
| 2009/0244542 A1* | 10/2009 | Cho et al. | 356/445 |
| 2009/0289177 A1 | 11/2009 | Yao et al. | |

FOREIGN PATENT DOCUMENTS

| | | |
|---|---|---|
| JP | 2002350544 A | 12/2002 |
| JP | 2002373450 A1 | 12/2002 |
| WO | 0237410 A1 | 5/2002 |
| WO | 2006034677 A1 | 4/2006 |
| WO | WO2009/031087 A1 * | 3/2009 ............... G01B 9/02 |

OTHER PUBLICATIONS

Ishikawa, Koji et al "An Integrated Micro-Optical System for VCSEL to Fiber Active Alignment", Sensors and Actuators, vol. 103, 2009, pp. 109-115.

* cited by examiner

SELF-MIXING INTERFERENCE DEVICE WITH WAVE GUIDE STRUCTURE

FIELD OF THE INVENTION

The present invention relates to a self-mixing interference device based on a semiconductor laser source and a photodetector arranged to detect intensity variations of laser radiation emitted by said semiconductor laser source.

BACKGROUND OF THE INVENTION

Such a laser sensor based on self-mixing interferometry (SMI) allows the measurement of velocities, vibrations and distances covering a broad range of applications. Self-mixing interference devices make use of the effect, that laser light which is scattered back from a target object and re-enters the laser cavity, interferes with the resonating radiation and thus influences the output properties of the device. When the laser is operated in a suited regime the response of the back coupled light is linear, and resulting variations in output power contain traceable information on the movement or the distance of the target object with respect to the device. The frequency of these variations in output power is measured. To this end, the laser output signal is typically collected with a photodiode or phototransistor. The distance between the target object and the laser-cavity determines the phase of the back-scattered light when re-entering the laser cavity and hence whether there is destructive or constructive interference. When the object moves, the distance and hence the phase changes at a rate proportional to the velocity of the object. Therefore constructive and destructive interference occurs at a frequency proportional to this velocity. Since this so-called Doppler frequency only gives information on the magnitude of the velocity but not on its direction, modulation techniques have to be used to determine the direction. When using a semiconductor laser as laser source, in particular a VCSEL (vertical cavity surface emitting laser), the laser can be operated with a defined current shape, e.g. a periodic saw tooth or triangular current, causing the output frequency to almost instantaneously follow these current variations due to the simultaneously changed optical resonator length. This change in resonator length is temperature induced, resulting from the dissipative heating by the laser current. The resulting difference in frequency between the resonating and the back scattered light can be evaluated in suitable electronics and can be translated back into information about the position of the target object and its direction of movement.

WO 02/37410 A1 discloses a method and device for measuring the movement of an object. The method and device use the self-mixing interference effect in order to measure the movement of the object, which in the preferred application is the movement of a finger on an input device. With such a device which is also known as Twin-Eye laser sensor, a quasi 3D displacement of the object can be measured, in particular for use in input devices like PC-mice.

The total height of such a known sensor cannot be reduced freely since a certain round-trip length is needed in order to achieve a Doppler frequency in the correct regime. Presently this results in a minimum distance of the laser source output surface, typically a VCSEL, to the measured object surface of about 5 mm and a total height of the sensor bottom to the surface of 6 mm. Although this height does not impose restrictions for use in PC mice it is prohibitive for use input devices like e.g. mobile phones or mp3 players. Also for trackballs for e.g. remote controls or notebooks the sensor height is preferably equal to the size of the ball. The large distance between the output of the laser source and the measured object also causes a significant reduction of the signal strength, such that a focusing element is needed in order to focus the light and regain signal strength. In order to measure in two directions two laser sources are used spaced away from each other and an optical element is required to deflect the beams and focus the laser light. This optical element has to be placed with high accuracy with respect to the VCSELs to meet tolerances on the accuracy of the sensor.

SUMMARY OF THE INVENTION

It is an object of the present invention to provide a self-mixing interference device, in particular for use in an input device, which self-mixing interference device can be realized with a lower height and at lower cost compared to the above known self-mixing interference devices.

The object is achieved with the self-mixing interference device according to claim 1. Advantageous embodiments of this device are subject matter of the dependent claims or are disclosed in the subsequent portions of the description.

The proposed self-mixing interference device comprises a substrate with an integrated optical wave guide structure, a semiconductor laser source, in particular a VCSEL, arranged on a surface of the substrate and emitting laser radiation towards said surface, and a photodetector arranged to detect intensity variations of the laser radiation. The wave guide structure is optically connected to the laser source and designed to guide the laser radiation emitted by the laser source to an out-coupling area at the surface of the substrate and to guide a portion of the laser radiation back scattered from a target object outside of the substrate to re-enter the laser source. In an advantageous embodiment of the device two integrated optical wave guide structures, two semiconductor laser sources and two photo-detectors are arranged on the substrate in such a manner that the movement of the target object is measured simultaneously in two independent axes like in the above described Twin-Eye laser sensor. To this end, the laser radiation of the two laser sources has to be coupled out in directions orthogonal to each other.

By using an integrated optical wave guide structure to transport the light emitted from and back reflected to the laser source the above limitation of the total height of the device is overcome. The distance needed for the light between the emitting surface of the laser source and the target object in order to perform the desired measurement is provided by the length of the wave guide structure between the laser source and the out-coupling area. Since the wave guide structure extends in the plane of the substrate, parallel to its surface, this does not influence the height of the whole device. The length of the wave guide structure between the laser source and the out-coupling structure can therefore be tuned for achieving the optimum Doppler frequency for the used signal processing scheme. The optical length of the waveguide structure between the laser source and the out-coupling area may e.g. be in the range between 0.2 and 100 mm, preferably between 2 and 20 mm. In particular for applications in an input device, the wave guide structure can be shaped to place the sensing area, i.e. the in- and out-coupling structure, at any desired position on the substrate surface. Furthermore, by eliminating the need for a focusing element and at the same time eliminating the need for high accuracy placement of this element, the device can be produced with lower cost.

By providing two active VCSEL mesas in one die, in particular a GaAs die, two independent directions can be measured using separate wave guide channels for each individual VCSEL. With the two lasers monolithically integrated, a minumum die area is required and the lasers can be placed by a single pick-and-place action. The total die area required for the two VCSELs in case of monolithic integration is similar to that of one single VCSEL. The reduced die area compared to two VCSELs on separate dies and the smaller number of pick and place actions in assembly result in a significant saving of manufacturing costs. The wave guide channels, as already pointed out above, have out-coupling structures for orthogonal directions, e.g. with appropriate refractive or defractive optical elements to achieve the out-coupling in the orthogonal directions. The 2D motion of the object can be sensed with such a device with only one VCSEL die.

In an advantageous embodiment of the device, the wave guide structure is a silicon embedded wave guide structure extending parallel to the surface of the substrate. The silicon channel of the silicon embedded wave guide is surrounded by material with a large refractive index contrast.

Such wave guide structures can be made in standard CMOS compatible silicon technology, resulting in a low cost production. As compared to the current Twin-Eye design, the need for a lens and two separate VCSELs is eliminated so that the costs can be significantly reduced to a level competing with other sensors for optical mice.

The substrate or wave guide structure preferably comprises a first coupling structure to couple the laser radiation at a first position of the surface into the wave guide structure and a second coupling structure to couple the laser radiation at a second position of the surface out of the wave guide structure. The second coupling structure is preferably designed to couple out said laser radiation at an angle ≠0° to a normal to said surface. This is in order to achieve an out-coupling component of the laser light in the direction of movement of the object, which typically is parallel to the surface of the substrate. The out-coupling structures for example may comprise convex mirrors with additional deflection elements or refractive gratings.

BRIEF DESCRIPTION OF DRAWINGS

The proposed device is described in the following by way of example in connection with the accompanying figures without limiting the scope of protection as defined by the claims. The figures show FIG. 1 an example of a schematic setup of the proposed device according to the present invention;

DETAILED DESCRIPTION OF EMBODIMENTS

Figure 1:
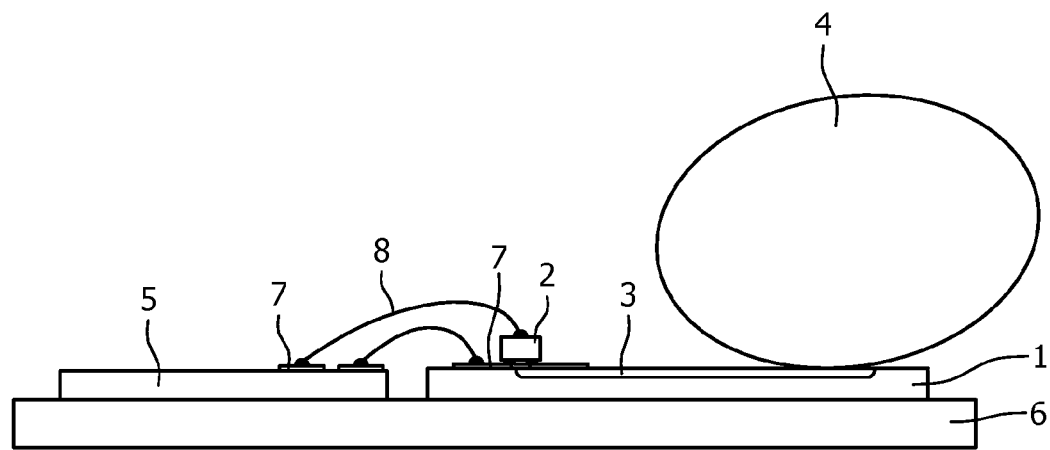

FIG. 1 schematically shows an embodiment of the proposed self-mixing interference device. A single mode silicon embedded wave guide 3 is embedded in a substrate 1. On this substrate 1, a VCSEL 2 with integrated photodiode is mounted, emitting laser radiation in the direction of the substrate. The single mode silicon embedded wave guide 3 and the VCSEL 2 are arranged such that the laser light emitted by the VCSEL 2 is coupled into the wave guide 3. At an out-coupling area not specially indicated in this figure, the laser light leaves the wave guide to be scattered back by an object 4 moving about this out-coupling surface.

The laser light typically is diffusely scattered back from the moving object. In the prior art sensor, where the lens is spaced from the moving object, only the laser light that is scattered back in the space angle captured by the lens can contribute to the self-mixing signal, leading to a significant reduction in signal strength. In the device of the present invention, due to the provision of the waveguide structure, the moving object is close to the outcoupling structure. This results in a much larger spacial angle capturing diffusely back scattered light, and thus in an improved signal strength.

The VCSEL 2 and the integrated photodiode are connected via metal pads 7 on the substrate by wire connections 8 to an ASIC 5 (ASIC: Application Specific Integrated Circuit), which is designed to control the VCSEL 2 and to evaluate the signals of the photodiode in order to determine the movement of the object 4. The substrate 1 and the ASIC 5 are mounted on a PCB or sub-mount 6.

Figure 2:
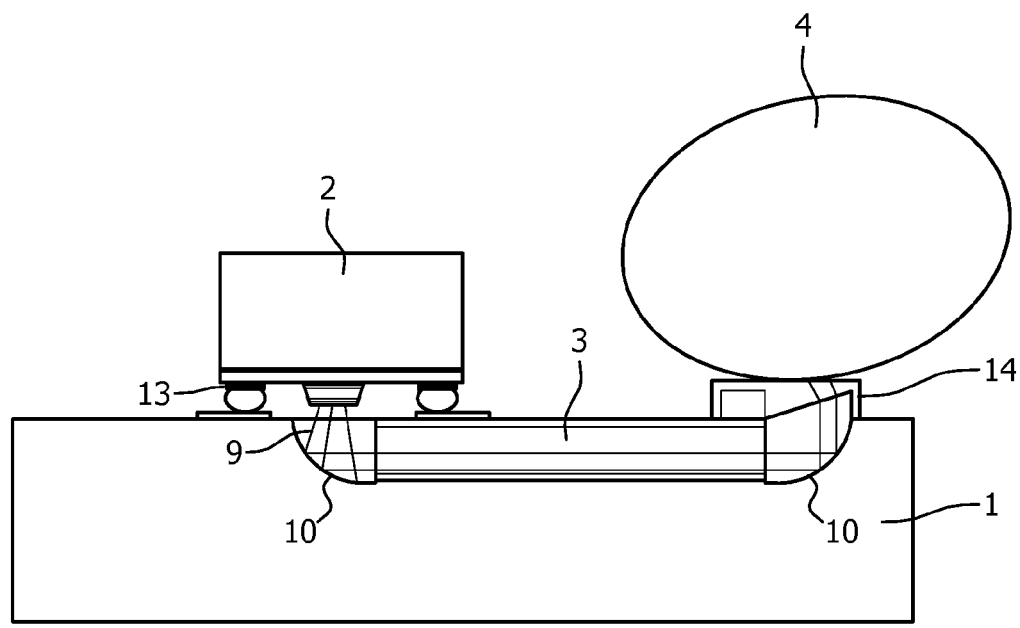
FIG. 2 a more detailed schematic view of the proposed device.
Figure 4:
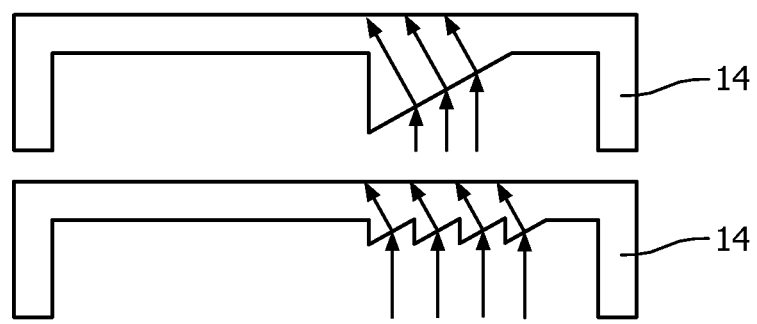
FIG. 4 examples of refractive optical elements for deflection.

FIG. 2 shows a more detailed cross sectional view of the device. The VCSEL with integrated photodiode (VIP) 2 is flip-chip mounted on the substrate 1 about the in- and outcoupling structure, e.g. by using so-called solder bumps which both mechanically as well as electrically connect bonding pads 13 on the VCSEL to the bonding pads 7 on the substrate. The in-coupling structure is formed in this example by a concave mirror 10 in the substrate 1. Through this mirror 10 the laser radiation 9 emitted from the VCSEL is coupled into the silicon embedded wave guide 3. The out-coupling structure is also formed by a concave mirror 11 formed in the substrate 1 and additionally comprises a deflecting optical element 14 as can be seen from FIG. 2. This deflecting optical element 14 deflects the light reflected by the mirror 11 to achieve an out-coupling direction which is not perpendicular to the surface of the substrate 1. FIG. 4 shows two examples of such a deflecting optical element 14.

The light emitted from the VCSEL 2 thus travels with low loss to the point where movement detection needs to be measured. The in- and out-coupling structures to this end allow the light to be projected on the moving object 4, a finger in this example, and allow the back-scattered light to travel back to the VCSEL 2 where it contributes to self-mixing interference. If the losses of the wave guide 3 at the in- and out-coupling structures 10, 11 are sufficiently low, the strength of the self-mixing interference signal is similar to that at zero distance between the object 4 and the VCSEL 2.

A typical VCSEL which can be used in the proposed device emits infrared radiation around 1 μm wavelength with a typical power of few milliwatts. The laser cavity consists of two stacks of distributed Bragg reflectors (DBR) which are epitaxially grown on a suited substrate, in particular a GaAs substrate, and which enclose a resonator that contains gain region made up from several quantum wells. The DBR-layers also take over the task of feeding current into the gain region, therefore one is usually n-doped and the other p-doped. One DBR is designed to be highly reflective, typically with a reflectivity of >99.8%, while the other one allows a higher degree of out-coupling and thus also feedback to the laser cavity. A photodetector, which in this example is monolithically integrated in the VCSEL chip, measures the small amount of radiation leaking out of the highly reflective DBR mirror and thus monitors the variations in the output power of the laser. Monolithic integration allows using wavelengths below 920 nm (850 nm is being used) where the GaAs substrate of the VCSEL is not transparent.

Figure 3:
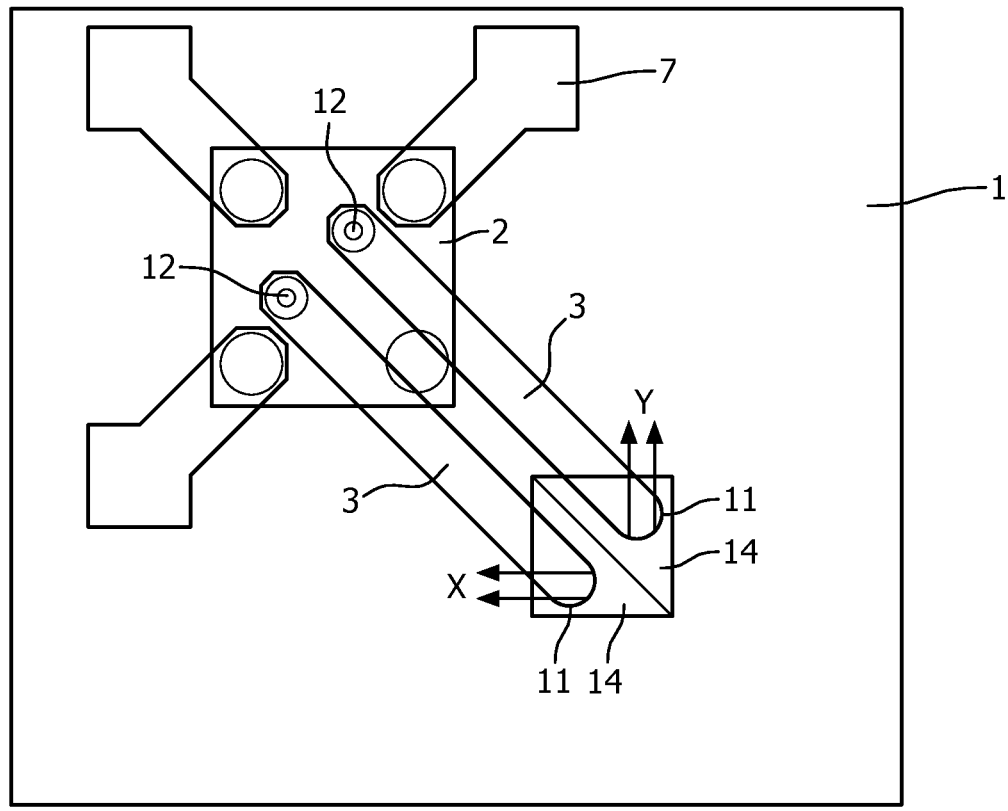
FIG. 3 a top view of a further example of the proposed device.

FIG. 3 shows a top view of a further embodiment of the proposed device in which two laser sources with two wave guide structures are arranged such that the laser light emitted at the out-coupling area is directed into orthogonal directions. In this embodiment, two active VCSEL mesas 12 are provided in one single die. The two wave guide channels 3 guide the laser radiation emitted by the two VCSELs to closely spaced out-coupling areas with out-coupling structures 11. The out-coupling structures are designed to have orthogonal directions. Therefore, 2D motion sensing for input devices can be achieved with one single VCSEL die in this embodiment.

Although in this example the out-coupling areas are closely spaced. In the proposed device the out-coupling areas may be widely spaced as well. This allows multiple channels fed from one VCSEL die with several VCSEL apertures to measure movement at different locations for e.g. other applications than input devices. It would e.g. also allow introducing redundancy by having two or more VCSELs coupled to closely spaced out-coupling areas, e.g. to imrpove the meantime between fail of sensors. By providing more than one laser source, in particular VCSEL, preferably sharing one single die, with corresponding waveguide channels and out-coupling structures distributed over at least a portion of the 2D-plane of the substrate, different applications of the device are possible. For example, in one application the device can be used to locate an object, or in another application the device can be used to measure the movements of several objects at the same time.

The electrical contacts to the VCSEL mesas 12 in the ground contact of the whole VIP are achieved through flip-chip mounting on metal pads 7 on the silicon substrate. By wire bonding these can be connected to the ASIC, as already shown in FIG. 1. The VCSEL structure in this example is build up as follows: n-substrate (PD-cathode), intrinsic and p-layer (PD-anode) forming together the reversed biased photodiode (PD); then the n-mirror (VCSEL cathode), which is electrally connected to the PD-anode and collectively connected to ground, the resonator with quatum wells and finally the p-mirror (VCSEL anode) which is forward biased. The VCSEL anode and the connected VCSEL cathode and PD-anode are connected by bonding pads on the front-side of the VCSEL, which through solder bumps are connected to the bonding pads 7 on the silicon substrate. The PD-cathode is directly wirebonded to the ASIC.

While the invention has been illustrated and described in detail in the drawings and foregoing description, such illustration and description are to be considered illustrative or exemplary and not restrictive, the invention is not limited to the disclosed embodiments. The different embodiments described above and in the claims can also be combined. Other variations to the disclosed embodiments can be understood and effected by those skilled in the art in practicing the claimed invention, from a study of the drawings, the disclosure and the appended claims.

In the claims the word "comprising" does not exclude other elements or steps, and the indefinite article "a" or "an" does not exclude a plurality. The mere fact that measures are recited in mutually different dependent claims does not indicate that a combination of these measures cannot be used to advantage. Any reference signs in the claims should not be construed as limiting the scope of these claims.

LIST OF REFERENCE SIGNS 1 silicon substrate
2 VCSEL with integrated photodiode
3 silicon embedded wave guide channel
4 object
5 ASIC
6 PCB or sub-mount
7 metal pad
8 wire connections
9 laser radiation
10 concave mirror
11 concave mirror
12 VCSEL mesa
13 metal bonding pad
14 deflecting element

The invention claimed is:

1. A self-mixing interference device comprising:
a substrate with an integrated optical waveguide structure;
a semiconductor laser source, arranged on a surface of said substrate and emitting laser radiation towards said surface; and
a photodetector arranged to detect intensity variations of said laser radiation, wherein said waveguide structure is optically connected to said laser source and is configured to guide said laser radiation emitted by said laser source to an out-coupling area at said surface of said substrate for output of said laser radiation from said surface to a target object and to guide a portion of said laser radiation scattered back from the target object outside of said substrate to re-enter the laser source,
wherein said waveguide structure includes a coupling structure located in the substrate to collimate said laser radiation and couple said collimated laser radiation at an output position of said surface out of said waveguide structure for output of said collimated laser radiation as parallel beams,
wherein the coupling structure comprises at least one concave mirror and an optical deflecting element, the at least one concave mirror collimating the laser radiation and reflecting the collimated laser radiation toward said optical deflecting element for deflecting the laser radiation as it passes through the optical deflecting element for output of the collimated laser radiation from the optical deflecting element toward the target object as the parallel beams, and
wherein the optical deflecting element includes a portion having a saw-tooth shape for receiving the collimated laser radiation from the at least one concave mirror and changing a direction of the collimated laser radiation for output of the collimated laser radiation from the optical deflecting element toward the target object as the parallel beams.

2. The device according to claim 1, wherein said semiconductor laser source is a VCSEL.

3. The device according to claim 1, wherein said waveguide structure is a silicon embedded waveguide structure.

4. The device according to claim 1, wherein said substrate or waveguide structure comprises a further coupling structure to couple said laser radiation at an input position of said surface into said waveguide structure.

5. The device according to claim 1, wherein said coupling structure is configured to couple out said laser radiation at an angle #0 to a normal to said surface.

6. The device according to claim 1, wherein said coupling structure deflects the laser radiation to be coupled out at an angle ≠0 to the normal to said surface.

7. The device according to claim 1, wherein a control and evaluation unit is electrically connected to said laser source and said photodetector, said control and evaluation unit being configured to control said laser source to emit the laser radiation and to evaluate signals of said photodetector to determine one or combination of a distance and a movement of said target object.

8. The device according to claim 1, wherein an optical length of said waveguide structure between the laser source and the out-coupling area is selected to be in the range between 2 and 20 mm.

9. The device according to claim 1, further comprising
one or several further integrated optical waveguide structures,
one or several further semiconductor laser sources arranged on said surface of said substrate and emitting further laser radiation towards said surface, and
one or several further photodetectors arranged to detect intensity variations of said further laser radiation,
said further waveguide structure(s) being optically connected to said further laser source(s) and configured to guide said further laser radiation emitted by said further laser source(s) to one or several further out-coupling areas at said surface of said substrate and to guide a portion of said further laser radiation scattered back from said target object or from other target objects outside of said substrate to re-enter the further laser source(s).

10. The device according to claim 9, wherein the waveguide structure and the further waveguide structure and corresponding out-coupling areas are configured to couple out the laser radiation and the further laser radiation with components along a plane parallel to said surface of said substrate and orthogonal to each other.

11. The device according to claim 9, wherein two or more of the laser sources are formed of two or more VCSEL mesas on one common semiconductor die.

12. The device according to claim 1, wherein the coupling structure comprises a further concave mirror for receiving the laser radiation from the semiconductor laser source and reflecting the laser radiation to form the collimated laser radiation for input into the waveguide structure.

13. A self-mixing interference device comprising:
a substrate with an integrated optical waveguide structure;
a semiconductor laser source located on a surface of the substrate and emitting laser radiation towards the surface; and
a photodetector configured to detect intensity variations of the laser radiation,
wherein the waveguide structure includes a coupling structure to couple the laser radiation from the semiconductor laser source to the waveguide structure and to couple the laser radiation out of the waveguide structure at an output position of the surface to a target object and to guide a portion of said laser radiation scattered back from the target object outside of said substrate to re-enter the laser source,
wherein the coupling structure comprises a mirror located in the substrate for receiving the laser radiation from the semiconductor laser source arranged on the surface of the substrate and reflecting the laser radiation into the waveguide structure,
wherein the coupling structure comprises a further mirror for receiving the collimated radiation from the waveguide structure and reflecting the collimated radiation towards an optical deflecting element for changing a direction of the collimated radiation to a changed direction for output towards the target object as parallel beams, and
wherein the optical deflecting element includes a portion having a saw-tooth shape for receiving the reflected collimated laser radiation from the further mirror and changing a direction of the reflected collimated laser radiation for output of the reflected collimated laser radiation from the optical deflecting element toward the target object as the parallel beams having the changed direction.

14. The device of claim 13, wherein the mirror reflects the laser radiation to provide collimated radiation into the waveguide structure.

* * * * *